(12) United States Patent
Jacovi et al.

(10) Patent No.: US 7,583,793 B2
(45) Date of Patent: Sep. 1, 2009

(54) MESSAGE NOTIFICATION INSTANT MESSAGING

(75) Inventors: Michal Jacovi, Rakefet (IL); Vladimir Soroka, Carmiel (IL)

(73) Assignee: International Business Machines Corporation, Armonk, NY (US)

( * ) Notice: Subject to any disclaimer, the term of this patent is extended or adjusted under 35 U.S.C. 154(b) by 797 days.

(21) Appl. No.: 11/186,567

(22) Filed: Jul. 21, 2005

(65) Prior Publication Data
US 2006/0018447 A1 Jan. 26, 2006

(30) Foreign Application Priority Data
Jul. 23, 2004 (EP) .................... 0416448

(51) Int. Cl.
*H04M 1/64* (2006.01)
(52) U.S. Cl. .............. 379/88.17; 455/466; 705/26; 707/3; 709/203; 709/206; 709/207; 709/217; 709/228; 713/176; 715/752
(58) Field of Classification Search ........... 379/88.17; 455/466; 705/1, 26; 715/752; 707/3; 709/203, 709/206, 207, 217, 228; 713/176
See application file for complete search history.

(56) References Cited

U.S. PATENT DOCUMENTS 7,317,928 B2 * 1/2008 Stewart et al. ............. 455/466
7,363,295 B2 * 4/2008 Szeto et al. ................. 707/3
7,376,703 B2 * 5/2008 Colson et al. ............... 709/206
7,386,798 B1 * 6/2008 Heikes et al. ............... 715/752
7,464,268 B2 * 12/2008 Kent et al. .................. 713/176
7,496,628 B2 * 2/2009 Arnold et al. ............... 709/206
2003/0046273 A1 * 3/2003 Deshpande ................. 707/3
2003/0208545 A1 * 11/2003 Eaton et al. ................. 709/206
2003/0229670 A1 * 12/2003 Beyda ........................ 709/206
2004/0049545 A1 * 3/2004 Wayne Lockridge et al. ......................... 709/206
2004/0122891 A1 * 6/2004 Meyers et al. ............... 709/203
2005/0021666 A1 * 1/2005 Dinnage et al. ............. 709/217
2005/0198317 A1 * 9/2005 Byers ......................... 709/228
2006/0031144 A1 * 2/2006 Todd ........................... 705/26
2006/0031367 A1 * 2/2006 Buford et al. ............... 709/207
2006/0277053 A1 * 12/2006 Lobb et al. .................. 705/1

* cited by examiner

Primary Examiner—Gerald Gauthier
(74) Attorney, Agent, or Firm—Michael J. Buchenhorner; Vazken Alexanian

(57) ABSTRACT

Methods, apparatus and systems for message notification in instant messaging are provided in which a message in an instant messaging session is received at a client application. The content of the received message is compared with a set of entries and the content is matched with an entry. Notification of a new message is displayed in a form representing the matched entry. Each entry may be associated with a category and the step of displaying notification represents the category of the matched entry. The entries may be any one of or a combination of words, phrases and/or symbols which commonly appear in messages such that a user can determine the category of a message content without focusing on the message.

9 Claims, 9 Drawing Sheets

MESSAGE NOTIFICATION INSTANT MESSAGING

TECHNICAL FIELD

This invention relates to the field of message notification in instant messaging. In particular, the invention relates to message notification in instant messaging in which the form of message notification represents the content of the message.

BACKGROUND OF THE INVENTION

Instant messaging (IM) enables a user to send and receive messages to and from other users in real time. A first user has an IM client software application that runs on his computer. When the first user is online, by being connected to a network such as the Internet, the IM client application opens a connection to an IM server. The IM client application sends a user identification and password to log onto the IM server. The IM server uses a communication protocol that allows for IM functionality.

The IM client application includes a contact list, which is a list of other users that the first user wishes to have the ability to send messages to. When the users identified in the contact list come online and log on to the IM server, the first user is notified so that messages can be sent and received. A message is sent to the IM server, which then routes the message to the identified user. In some implementations of IM systems, messages are sent directly between the IM client applications and the IM server is not involved in the transfer of messages.

IM applications are used primarily for text based chats, screen sharing, white-boarding and so on. In the case of a text based chat, the IM client application has a graphical user interface which provides a small window on the user's computer display for each chat that the user is having with his contacts. The window displays a scrolling dialogue of the chat between the first user and his contact.

Participating in an IM session is something busy people often do in parallel with performing other tasks. Such other tasks may include conducting additional IM sessions with other people, reading/authoring documents, programming, or any other activity. When another activity is being performed using a user's computer display, an IM window is out of focus.

IM applications support visual and/or audio notification to let the user know if a new message has arrived to an IM window that is out of focus.

A considerable amount of chat messages are actually predictable. This is especially true at the end of a chat, when departing "protocols" often require messages of the form "thanks", "no problem", "bye", "bfn" (short for "bye for now"), etc.

For a busy user, receiving the usual notification for an unfocused window indicating a new message has arrived means that the user has to refocus on the window in order to read the message. This is unnecessarily time consuming and annoying when a user refocuses on the window and sees only the final "bfn". However, choosing to not turn to that window if the user assumes it is just a "bye" may end up in the user missing an important message that the other party has added to the end of the chat.

SUMMARY OF THE INVENTION

Therefore, according to a general aspect of the present invention, there is provided methods, systems and apparatus to use different visual and/or audio cues for predictable responses. It is a further aspect to use these cues to distinguish between at least two different types or categories of such responses, for example, positive and negative responses.

According to an aspect of the present invention there is provided a method for message notification in instant messaging comprising: receiving a message; comparing the content of the received message with a set of entries; matching the content with an entry; displaying notification of the message in a form representing a matched entry.

According to a second aspect of the present invention there is provided a system for message notification in instant messaging comprising: means for receiving a message; a database of entries; mean for comparing the content of a received message with the entries in order to match the content with an entry; means for displaying notification of the message in a form representing a matched entry. Advantageously, the system is an instant messaging client application or an extension thereto.

According to a third aspect of the present invention there is provided a computer program product stored on a computer readable storage medium, comprising computer readable program code means for message notification in instant messaging, the code means performing the steps of: receiving a message; comparing the content of the received message with a set of entries; matching the content with an entry; displaying notification of the message in a form representing a matched entry.

BRIEF DESCRIPTION OF THE DRAWINGS

The invention and its embodiments will be more fully appreciated by reference to the following detailed description of illustrative embodiments in accordance with the present invention when taken in conjunction with the accompanying drawings, in which.

DETAILED DESCRIPTION OF THE INVENTION

Figure 1:
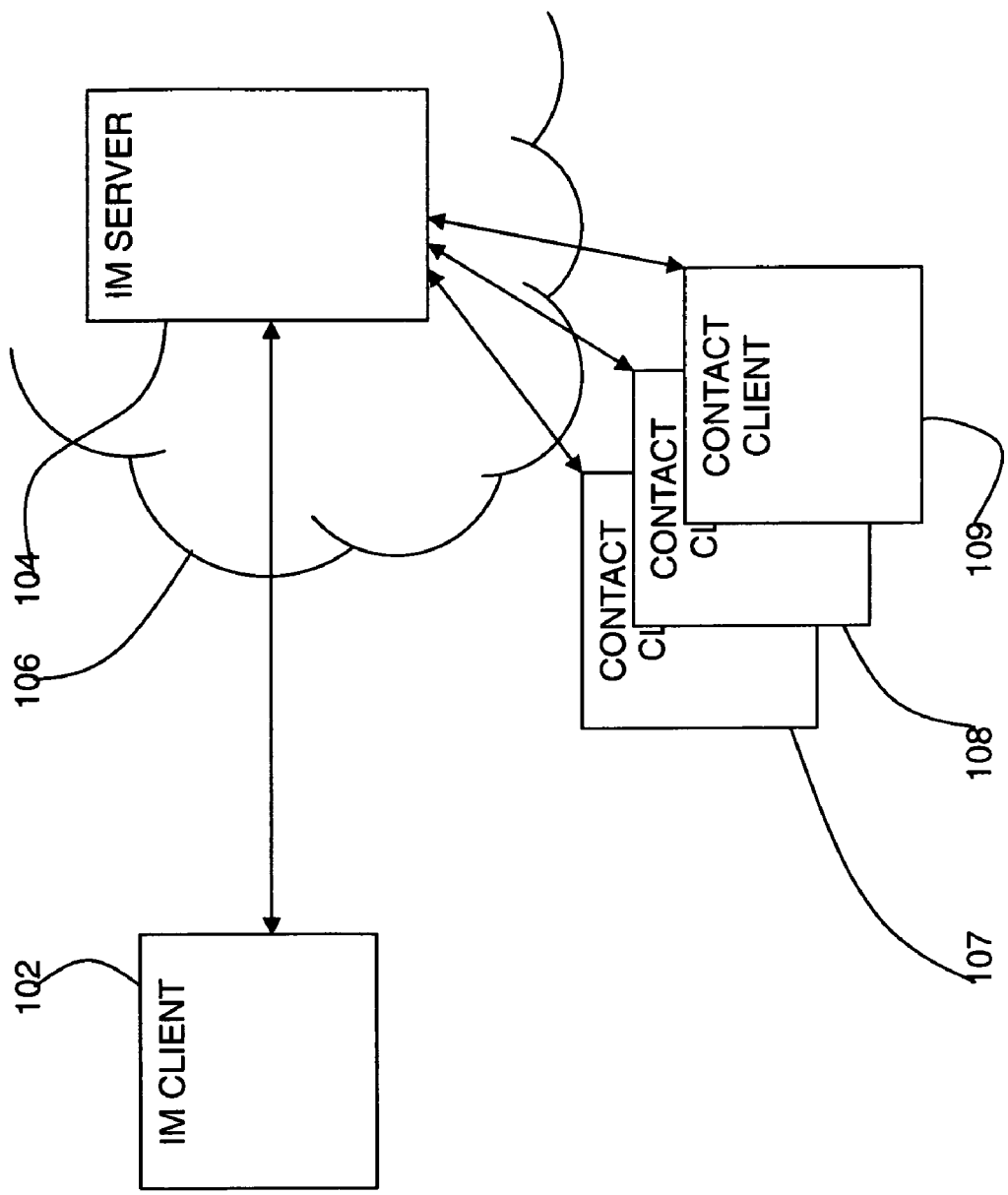
FIG. 1 is a block diagram of an instant messaging system as known in the prior art.

The present invention provides methods, apparatus and systems for using different visual and/or audio cues for predictable responses. The invention also provides for the use of these cues to distinguish between at least two different types or categories of such responses, for example, positive and negative responses.

In an example embodiment of the present invention there is provided a method for message notification in instant messaging comprising: receiving a message; comparing the content of the received message with a set of entries; matching the content with an entry; displaying notification of the message in a form representing a matched entry. Advantageously, each entry is associated with a category and the step of displaying notification is provided in a form representing the category of the matched entry. The entries may be any one of or a combination of words, phrases and/or symbols.

The method may include: displaying an instant messaging session in a window; and displaying a representation of the session when the window is out of focus; wherein the step of displaying notification alters the representation of the session. The altering of the representation of the session may include any one or more of a visual alteration including colour, blinking or the addition of an icon, and/or an audio indication. In this way, a user can determine the category of a message content by the representation of the session without focusing on the instant messaging session window.

In one embodiment, the step of matching matches the whole content of the message to an entry. In this way, the user can determine the category of a message content and can be sure that the message does not contain any additional information. In an alternative embodiment, the step of matching matches part of the content of a message and the form of displaying notification is represented accordingly. In this case, the form of displaying notification may be in the form representing the category of a message content with an additional indication that there is other content in the message.

The categories may include positive and negative categories of entry in order to allow a user to determine if a message content is positive of negative without focusing on the instant messaging session window. A user may add or remove entries to or from the set of entries and may customise the categories and the corresponding forms of displaying notification.

In another example embodiment of the present invention there is provided a system for message notification in instant messaging comprising: means for receiving a message; a database of entries; mean for comparing the content of a received message with the entries in order to match the content with an entry; means for displaying notification of the message in a form representing a matched entry. Advantageously, the system is an instant messaging client application or an extension thereto.

Advantageously, means are provided to associated each entry with a category and forms of displaying notification are provided for each category. For example, the categories may include positive and negative categories of entry. The entries may be any one of or a combination of words, phrases and/or symbols. The system may include: a window display of an instant messaging session; and a representation of the session when the window is out of focus; wherein the means for displaying notification alters the representation of the session. The altering of the representation of the session may include any one or more of a visual alteration including colour, blinking or the addition of an icon, and/or an audio indication.

In an example embodiment, the means for comparing compares the whole content of the message to an entry. In an alternative embodiment, the means for comparing compares part of the content of a message to an entry and the means for displaying notification displays the message in a form representing a part content match. The system may include means for adding or removing entries to or from the database and means for customising the categories and corresponding forms of displaying notification.

In still another example embodiment of the present invention there is provided a computer program product stored on a computer readable storage medium, comprising computer readable program code means for message notification in instant messaging, the code means performing the steps of: receiving a message; comparing the content of the received message with a set of entries; matching the content with an entry; displaying notification of the message in a form representing a matched entry.

FIG. 1 shows an instant messaging system as known in the prior art. An instant messaging (IM) client application 102 runs on a computer of a first user. An IM service application, also referred to as an IM server 104, provides the IM functionality via a network such as the Internet 106. When the IM client application 102 logs on to the IM server 104, the server 104 checks a screen name and password. This may be done by a separate login server. The IM server 104 uses a communications protocol that allows for IM functionality. The IM client application 102 has a graphical user interface, which displays the instant messaging functionality to the first user on a graphical display of the first user.

The IM client application 102 includes contact list capabilities. A list of people the first user would like to send and receive messages to and from is stored in the IM client application 102. This list of the screen names of the contacts is communicated to the IM server 104 so that when the listed people come online, the first user is notified by the IM server 104. Each contact has its own IM client application 107, 108, 109 which runs on each of their computers. When any of the contacts logs on, the first user's IM client application 102 is notified that they are online. Instant messages can then be sent and received in real time. Each message goes to the IM server 104, which routes the message to the intended recipient.

The graphical user interface of an IM client application 102 displays one or more IM windows each of which shows a chat between the first user and a contact. When the first user is entering text into a window to send or reading received text, the window is in focus. However, when the first user is not using the window, for example when he is waiting for a reply from his contact, the window is often out of focus by being minimized or covered by a window of another application which is in focus and in use by the first user.

When an IM window is out of focus, a small graphical indication of the IM window is provided usually in a tool bar of the first user's graphical display. The tool bar is generally in view of the first user regardless of the windows open on the display. In known IM client applications, the small graphical indication is highlighted in some way when a new message is received enabling the first user to focus on the IM window to read the new message. The highlighting may be by a change in colour, an icon, a sound or other effect.

Figure 2A:
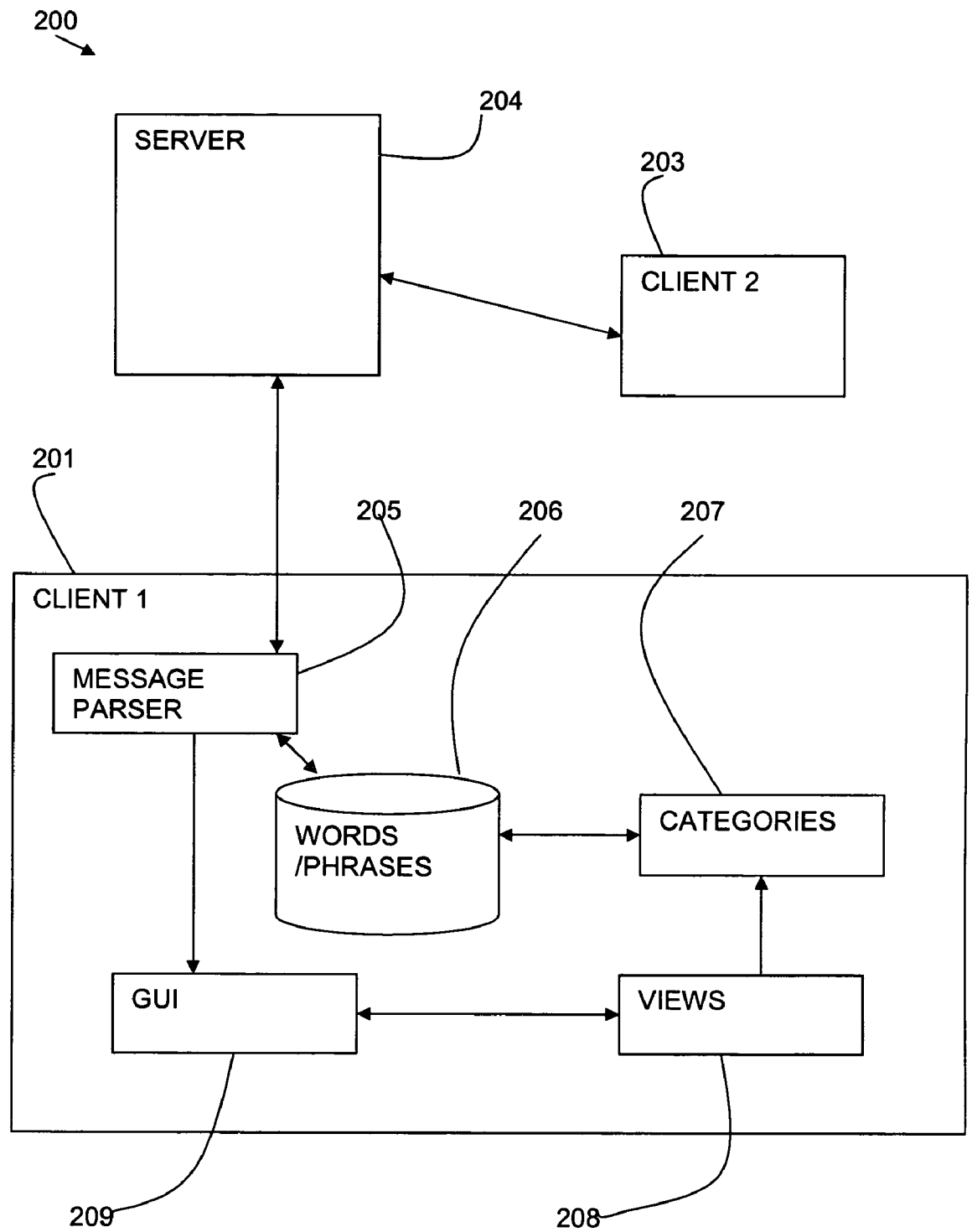
FIG. 2A is a block diagram of a system for instant messaging in accordance with the present application.
Figure 2B:
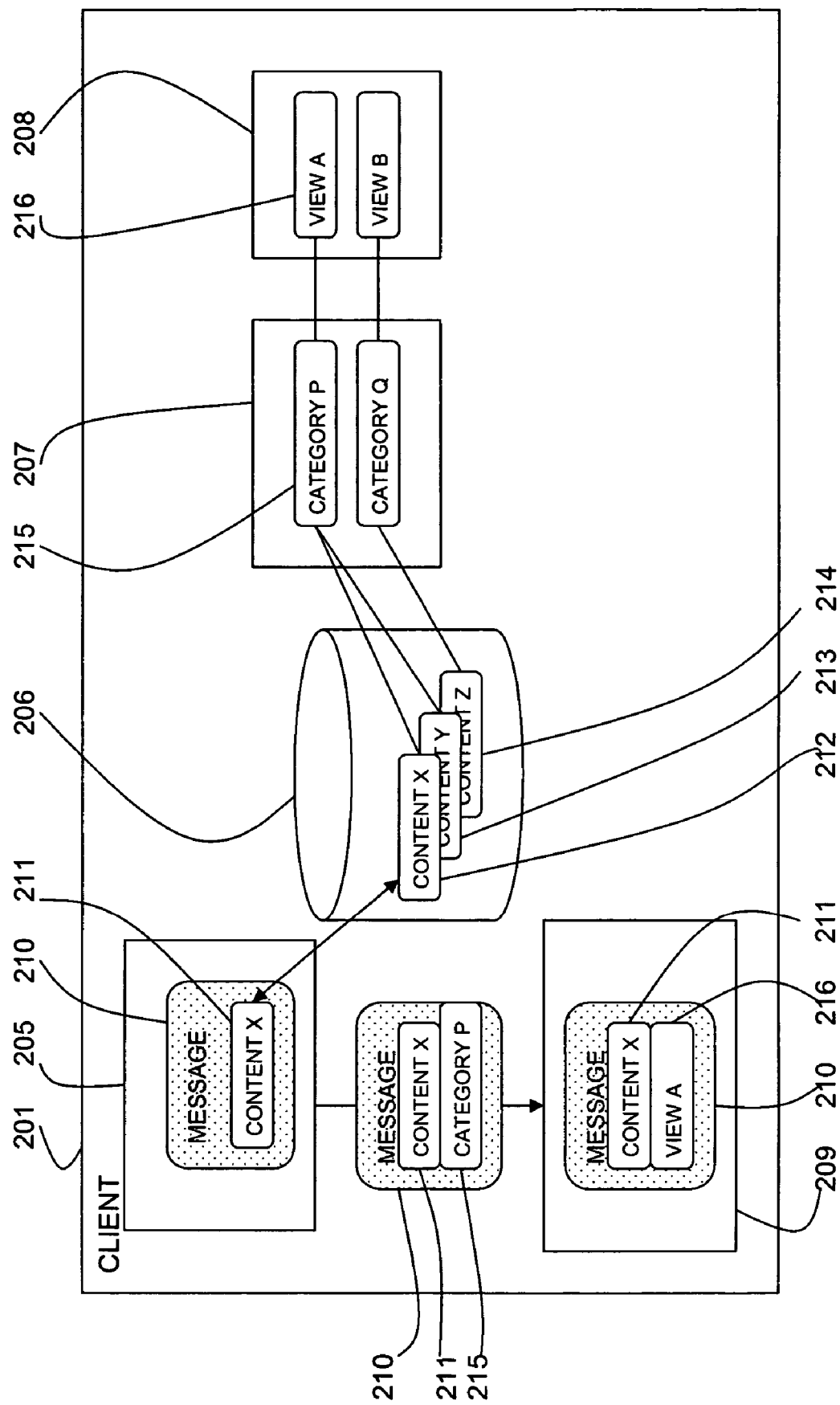
FIG. 2B is a detail of FIG. 2A showing a message being receiving at a client application of the system.

FIGS. 2A and 2B show an instant messaging system with additional functionality provided at the IM client application. The IM system 200 has an IM server 204 with multiple IM client applications 201, 203. The IM server 204 is a synchronous messaging server, for example, IBM's Sametime server (Sametime is a trade mark of International Business Machines Corporation) or Microsoft's Live Communication Server. Each IM client application 201 has the instant messaging functionality as known in the prior art together with an additional module shown in FIG. 2 providing improved functionality as described below.

The IM client application 201 includes a message parser 205 which parses the incoming messages. The IM client application 201 has a database 206 of entries in the form of any one of or a combination of words, phrases or symbols which may form the content of a message. Each of the entries of the database 206 is associated with a category 207. A selection of views 208 which provide forms of notification is also provided with a view 208 associated with each category 207. The entries in the database 206, the categories 207 and the views 208 can be customised by the user of the IM client application 201.

Referring to FIG. 2B, when a message 210 is received at the IM client application 201, the message parser 205 parses the incoming message 210 and the entire content 211 of the message 210 is checked against the entries 212, 213, 214 in the database 206. If the message content 211 matches an entry 212 in the database 206, the message parser 205 transfers the message 210 to the graphical user interface 209 of the IM client application 201 together with the category 215 of the matched entry 212. The graphical user interface 209 displays the message 210 using the view 216 associated with the category 215.

Figure 3:
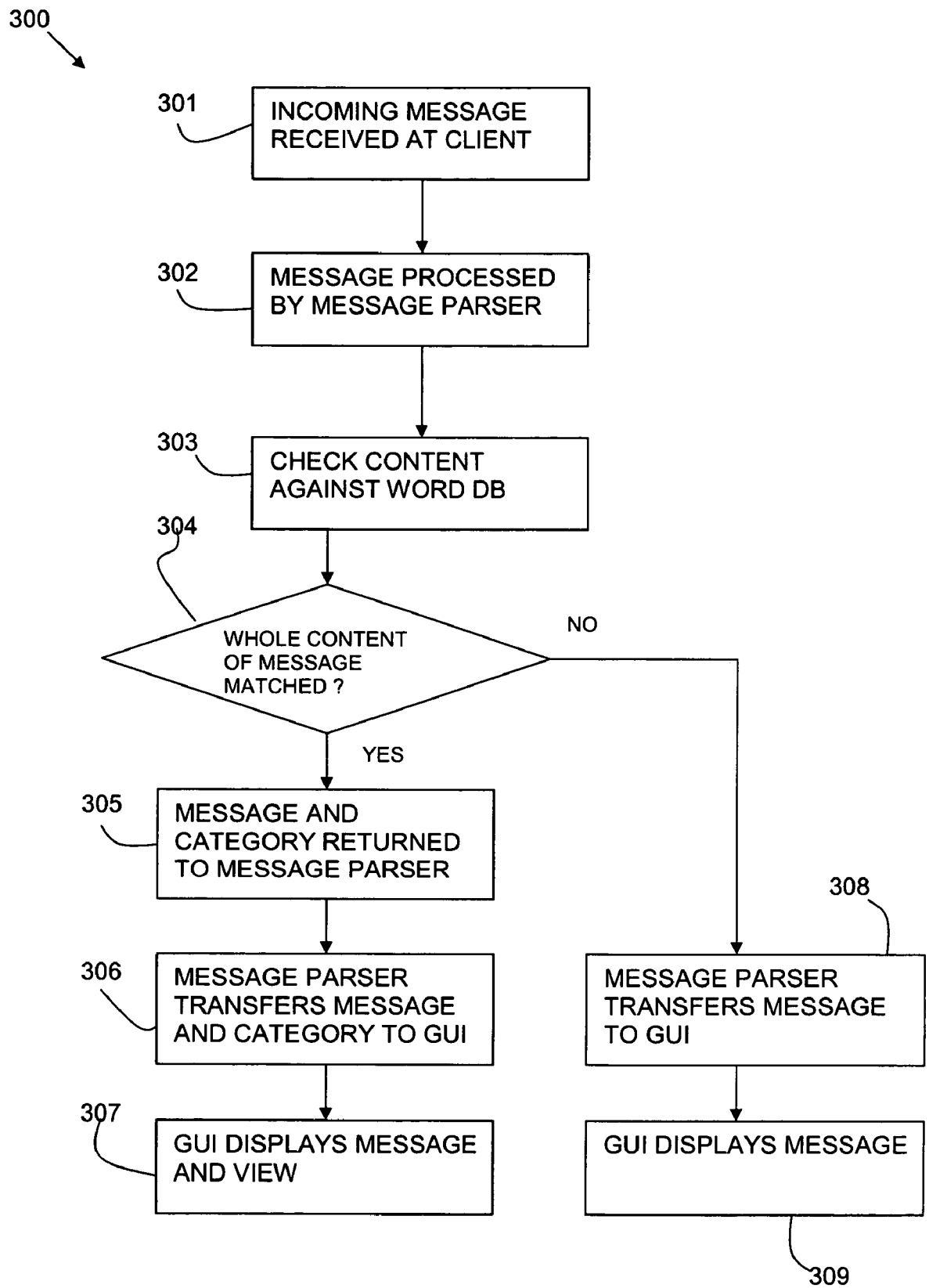
FIG. 3 is a flow diagram of a method for instant messaging in accordance with the present invention.

FIG. 3 is a flow diagram of the method 300 carried out by the IM client application when receiving a message. An incoming message is received 301 at the IM client application and the message is processed 302 by the message parser. The message parser checks 303 the content of the message against the database of word, phrase and/or symbol entries. It is determined 304 if there is a match for the content of the message in the database. If there is a match, the message is returned 305 to the message parser together with the category of the entries matched to the content. The message parser transfers 306 the message and the category to the graphical user interface of the IM client application. The graphical user interface displays 307 the message content in the form of a view associated with the category. If it is determined 304 that there is no match for the content of a message in the database, the message parser transfers 308 the message to the graphical user interface. The graphical user interface displays 309 the message in a standard way not using any of the views associated with the categories.

The purpose of the described system and method implemented by the IM client application is to provide an indication to the user of the IM client application of the category of the content of a message received. The indication provided by the view used by the graphical user interface can be applied to the small graphical indication provided in a tool bar of the user's graphical display to enable the user to identify the category of the content of a message without focussing on the IM window.

In one embodiment, the database of entries 206 may be in the form of a user dictionary containing stop words that are expected as "obvious" responses. A basic such stop list may be preloaded in the database, and a user may edit the database to add/remove entries to fit their instant messaging habits and requirements.

Once a message arrives that contains nothing but a stop word, the notification of this message would be different to the standard form of notification. The difference may be to resort to visual cue and eliminate the audio one, or it may use a different audio file for a more subtle notification. The visual cue may also be different, for example a faded colour, less blinking, etc.

The stop words may be distinguished in different categories. In this embodiment, the categories are positive and negative words, phrases or symbols. Positive words may include "yes", "thanks", "ok", ":-)"; while negative words may include "no", and ":-(". Different forms of notification or views are used for the different categories of messages. In this way, the user can deduce if the message received is positive or negative without changing focus from the window the user is currently working on to the IM window. While editing the database, the user may define different forms of notification for different categories, as suitable for their needs and habits.

Figure 4:
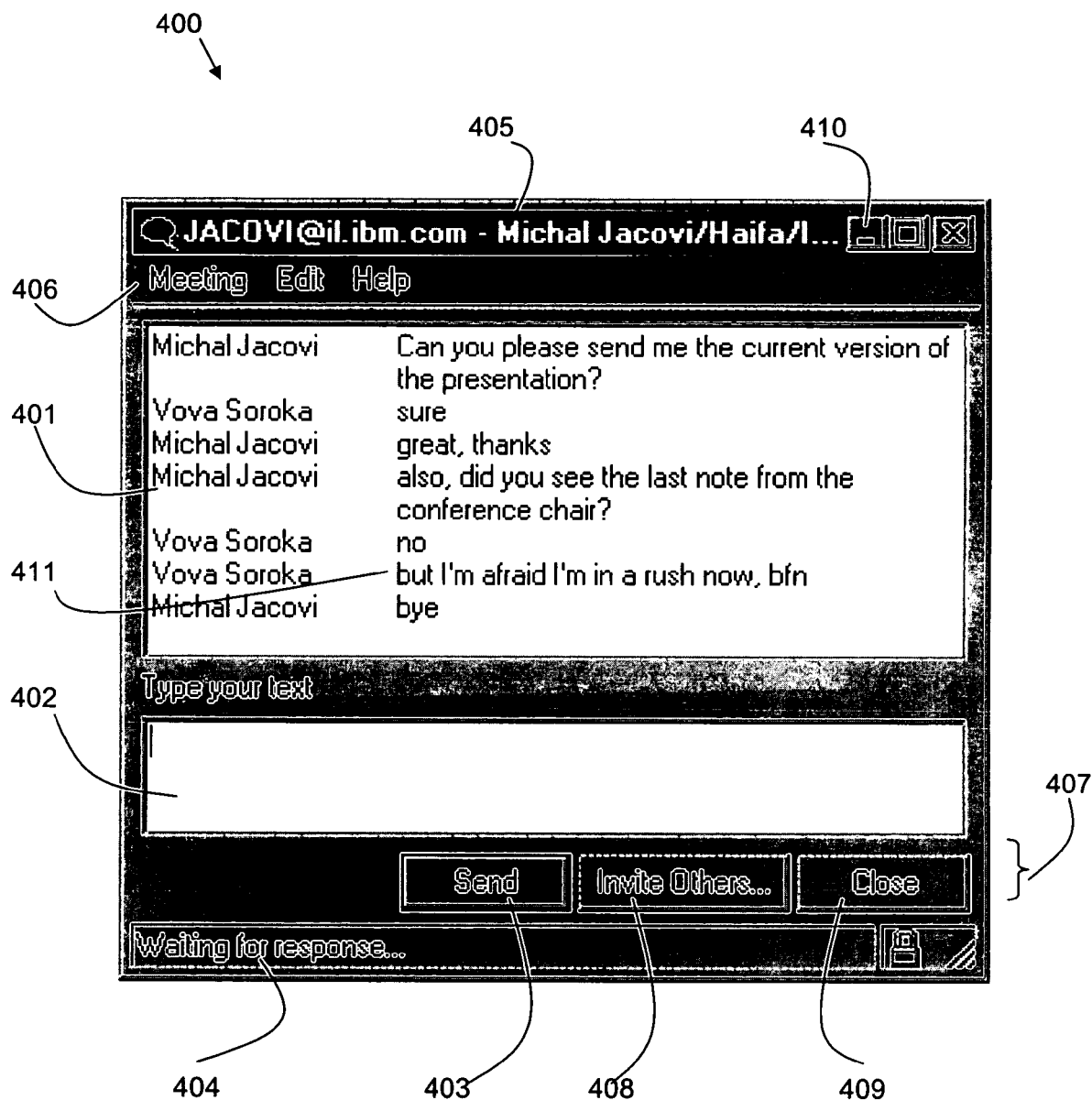
FIG. 4 is a screen shot of an instant messaging client application window in accordance with the present invention.

FIG. 4 shows a screen shot of an IM window 400 of an IM client application. The IM window 400 contains a box 401 in which the messages received in a chat 411 are displayed. There is also a box 402 in which the current message in the chat can be entered. The IM window 400 has a title bar 405 indicating the contact with which the chat is being held. A menu 406 of options is provided for activating other functionality of the IM client application. Selectable buttons 407 are provided to carry out immediate actions on the current message. These buttons 407 include a button 403 to send the current message, a button 408 to invite others to the chat, and a button 409 to close the chat. An indication 404 is provided showing the status of the chat.

The IM window 400 can be minimized by selecting a minimizing button 410 thereby rendering the window 400 out of focus to the user but still active. When this option is selected, a small graphical indication representing the window 400 is shown in a tool bar on the user's graphical display as described further in relation to FIG. 7.

The chat 411 shown in FIG. 4 contains examples of several words that would be suitable to qualify for a special notification when the message containing the words is received. For example, the messages "sure", "great, thanks", "no", "bye" can receive special notification as either short positive or negative responses and therefore may be provided as entries in a database for checking with categories of short positive or negative responses.

The user is in a rush and the contact still sends a "bye" after the "bfn" sent by the user. The special notification enables the user to understand that a short positive response has been received without having to refocus on the IM window 400 simply to read the message "bye".

However, it is important that messages which contain entries matched to the database in addition to other text are not notified as simply positive or negative entries as there may be information contained in the additional text which the recipient needs to read. Additional different categories may be provided for such messages. For example, a category may be provided for a positive response with additional information with an associated form of notification provided for this category.

Figure 5:
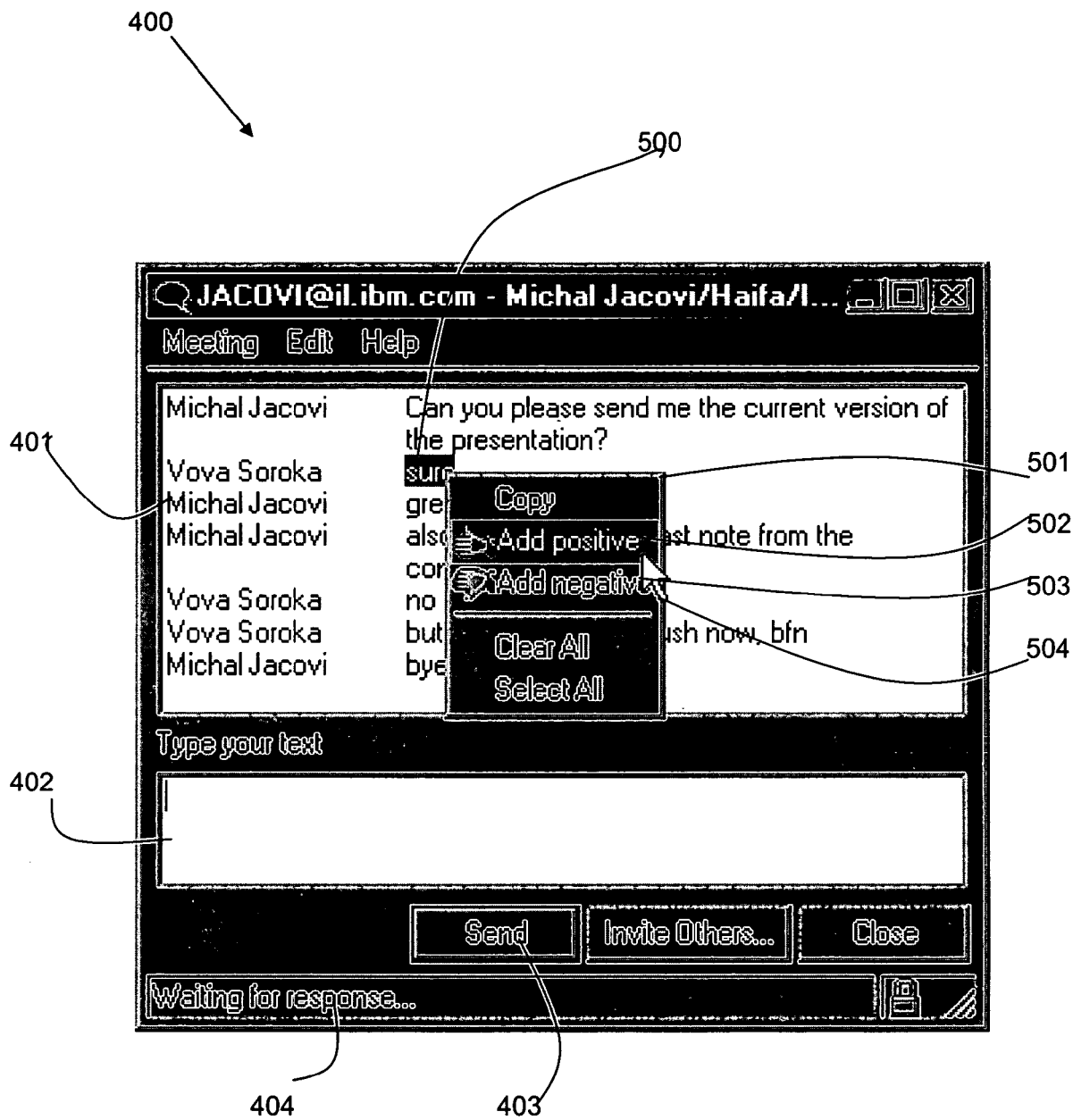
FIG. 5 is a screen shot of an instant messaging client application window in accordance with the present invention.

Referring to FIG. 5, while using the IM window 400, the user may identify words, symbols or phrases which he wishes to add to his database of entries. The identified word 500 is selected and a menu of options 501 obtained by selection from the menu 406 of the window 400 or by activating an input device, for example, right clicking on a mouse. The menu of options 501 includes adding a selected word 500 to a category of entries in the database. In the example shown in FIG. 5, the categories are positive 502 or negative 503. The selected word 500 is "sure" which is positive, therefore the word is added to the words in the database with the category of positive.

Figure 6:
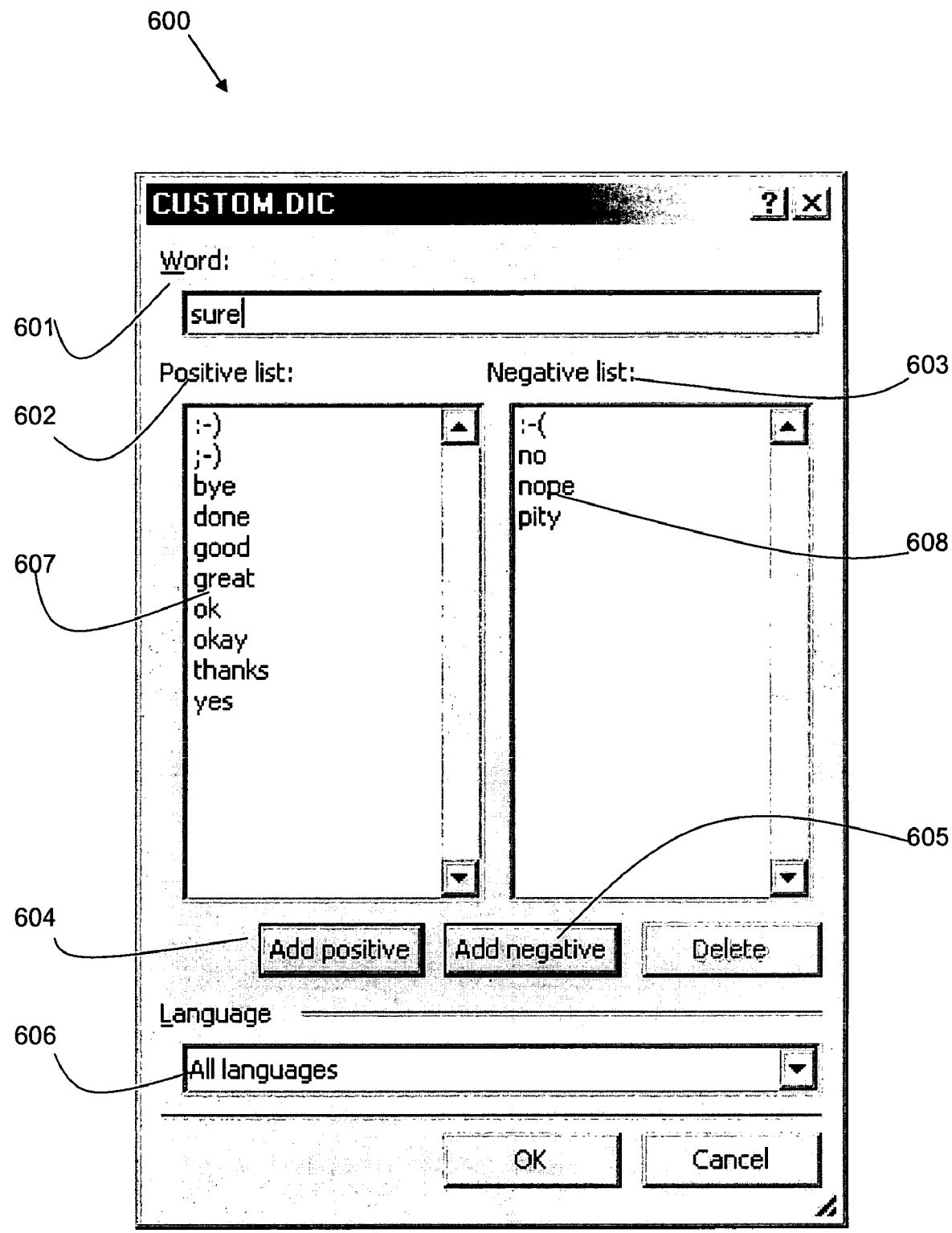
FIG. 6 is a screen shot of a database of content entries of an instant messaging client application in accordance with the present invention.

FIG. 6 shows an example of a database of entries in the form of a display window of a customer dictionary 600. The customer dictionary 600 includes a box 601 showing a selected new entry 610, a list of existing entries 607 in a first category, in this case, positive entries 602 and a list of existing entries 608 in a second category, in this case, negative entries 603. The new entry 610 can be added to a category by selecting an appropriate button 604, 605 for the chosen category. A delete option 609 is also provided for deleting an entry from a category 602, 603. The database of entries may include words or phrases used in different languages, in which case a specific language of entries may be chosen to be checked or entries of all languages 611 may be checked.

Figure 7:
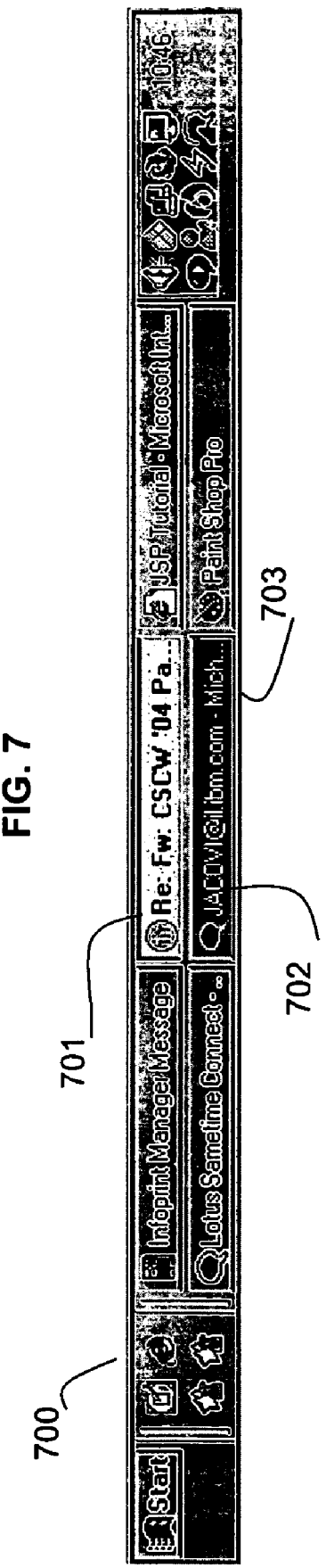
FIG. 7 is a screen shots of a tool bar of an instant messaging client application in accordance with the present invention.

Referring to FIG. 7, a tool bar 700 is shown which is usually visible to a user regardless of the windows open and/or in focus on the user's graphical display. The tool bar 700 includes small graphical indications of windows that are open on the user's graphical display. One small graphical indication 701 indicates that the window it represents is in focus. This is shown by the small graphical indication 701 being recessed as if depressed in the view.

A small graphical indication 702 is shown of an IM window, for example as shown in FIG. 4, relating to a chat with a contact identified in the small graphical indication 702. When a new message is received in this chat, the small graphical indication 702 in the tool bar 700 displays a notification. There may be a standard form of notification for indicating to a user that a new message has been received. For example, the form of notification may be to blink the small graphical indication 702, to display it in a colour, to make a sound, or a combination of such forms of notification. The user may customise his IM client application to chose the form of standard notification.

Additional functionality is provided by the categories of content of messages received in a chat. If a message is received and the content matches an entry in the user's database or custom dictionary, the form of notification will vary depending on the category of the entry.

Figure 8A:
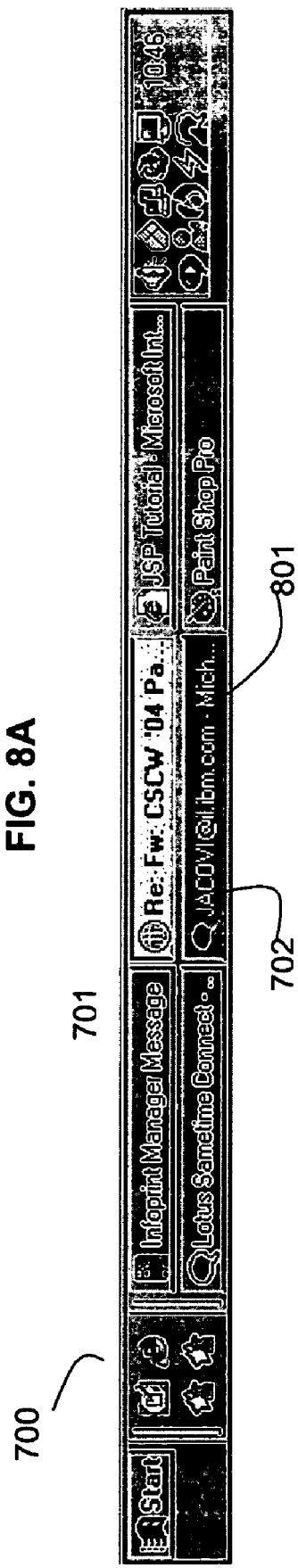
FIGS. 8A and 8B are screen shots of a tool bar of an instant messaging client application in accordance with the present invention showing a first embodiment of a means of representing different categories of message.
Figure 8B:
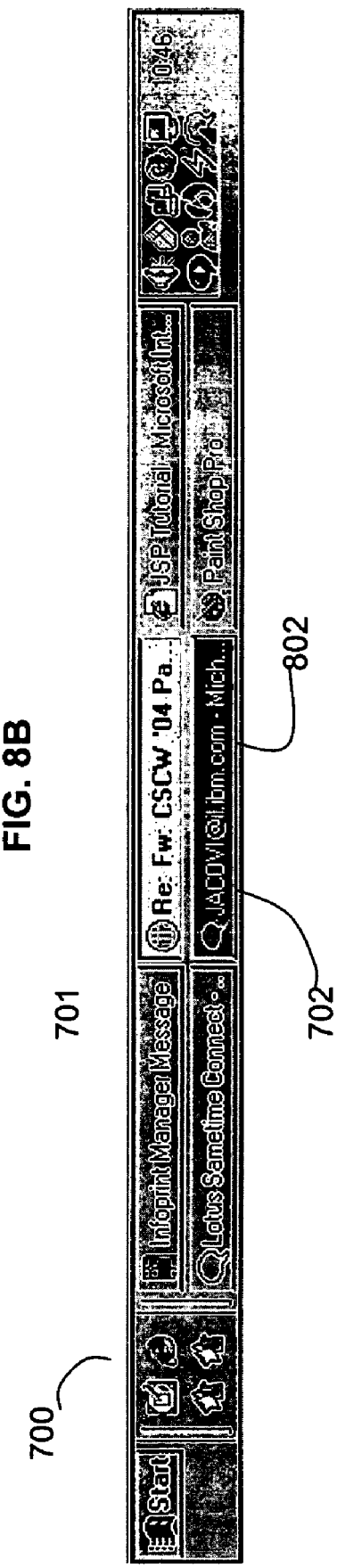

Referring to FIGS. 8A and 8B, in the example embodiment of positive and negative categories, the form of notification in which the small graphical indication is displayed to indicate a positive message content is a first colour 801 and a negative message content is a second colour 802.

Figure 9A:
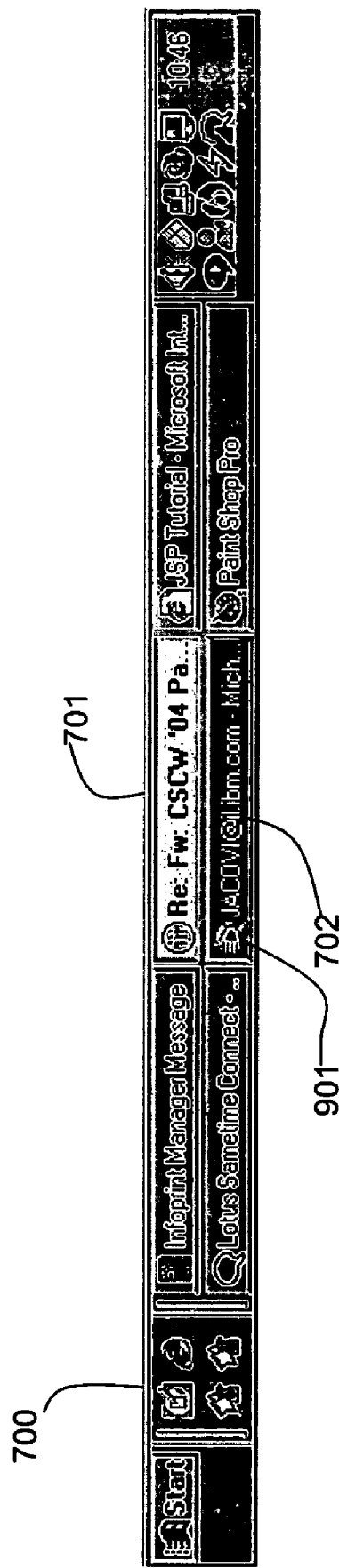
FIGS. 9A and 9B are screen shots of a tool bar of an instant messaging client application in accordance with the present invention showing a second embodiment of a means of representing different categories of message.
Figure 9B:
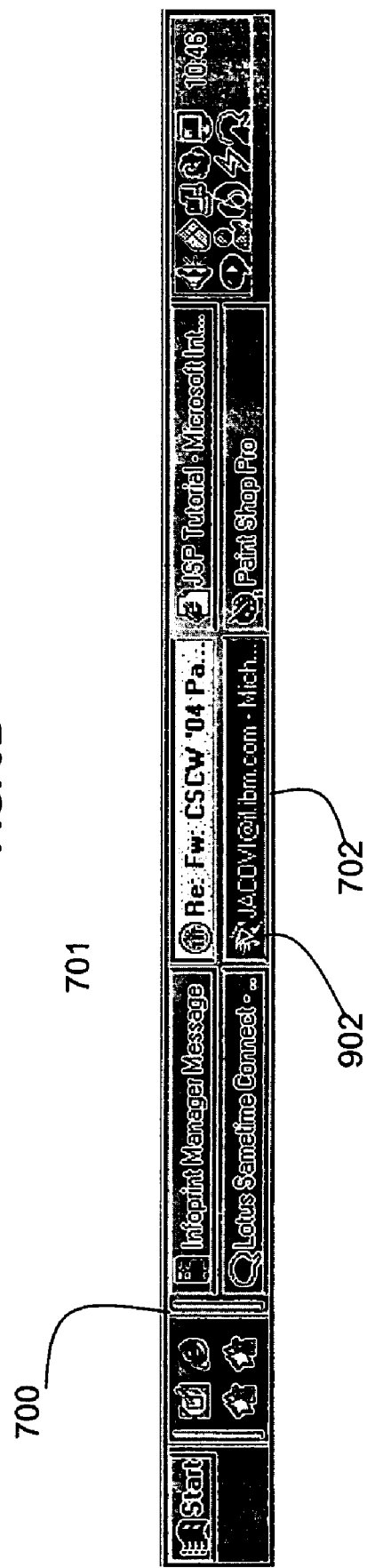

In an alternative embodiment shown in FIGS. 9A and 9B, the form of notification is a positive symbol 901 or a negative symbol 902 appearing in the small graphical indication 702. The forms of notification are stored in the IM client application in the form of views associated with the categories and the view is selected by the graphical user interface when displaying a new message notification. The use of the term "view" should not be construed as excluding the use of sound in place of or in addition to a visual effect. In this way, productivity can be increased in the workplace by enabling a user to receive and understand the general nature of a message in a chat he is not focusing on at that time. This removes the need to change focus between windows on the user display in order to read what may be a non-informative message.

The present invention is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

Improvements and modifications can be made to the foregoing without departing from the scope of the present invention. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention. Methods may be implemented as signal methods employing signals to implement one or more steps. Signals include those emanating from the Internet, etc.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed, is:

1. A method for message notification in instant messaging, said method comprising:

receiving an instant message at a user terminal, said user terminal comprising a graphical user interface, a database, and an instant messaging module comprising a message parser;

using the message parser for:

parsing the instant message;

comparing content of the received instant message with a set of entries in the database, wherein each entry is at least one of a word, a phrase, and a symbol, and wherein each entry is associated with a category and wherein each category is associated with a notification view;

matching the content with an entry from the set of the entries in the database; and transferring the instant message and a corresponding category of the matching entry to the graphical user interface; and using the graphical user interface for displaying the notification view of the instant message in a form associated with the category of the matched entry.

2. The method of claim 1 wherein the form comprises at least one of: a visual indicator and an audio indicator.

3. The method of claim 2 wherein the visual indicator comprises at least one form selected from: color, blinking, an icon, and a combination thereof.

4. The method of claim 1 wherein the matching step comprises matching an entire content of the instant message to an entry in the database.

5. The method of claim 1 wherein the matching step comprises matching part of the instant message to an entry in the database.

6. The method of claim 1 wherein the displaying step comprises displaying the form in a toolbar of the graphical user interface.

7. The method of claim 1 further comprising a step of: receiving from a user a modification to the database.

8. The method of claim 7 wherein the modification comprises an additional entry.

9. The method of claim 7 wherein the modification comprises a deletion of an entry.

* * * * *

UNITED STATES PATENT AND TRADEMARK OFFICE
CERTIFICATE OF CORRECTION

PATENT NO. : 7,583,793 B2 Page 1 of 1
APPLICATION NO. : 11/186567
DATED : September 1, 2009
INVENTOR(S) : Jacovi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1076 days.

Signed and Sealed this

Fourteenth Day of September, 2010

David J. Kappos
*Director of the United States Patent and Trademark Office*